United States Patent [19]

Nakanishi

[11] Patent Number: 5,507,331
[45] Date of Patent: Apr. 16, 1996

[54] DRILLING/CUTTING BIT, AND METHOD OF MAKING JOINT

[75] Inventor: Teruo Nakanishi, Kyoto, Japan

[73] Assignee: Nakanishi Construction Company, Japan

[21] Appl. No.: 275,344

[22] Filed: Jul. 15, 1994

Related U.S. Application Data

[63] Continuation-in-part of Ser. No. 263,338, Jun. 21, 1994, Pat. No. 5,599,667, which is a continuation-in-part of Ser. No. 274,825, Jul. 14, 1994.

[51] Int. Cl.⁶ ............................... B27M 1/00; B27C 1/00
[52] U.S. Cl. ............... 144/371; 144/134 R; 144/136 R; 144/150; 144/219; 144/220; 144/240; 144/365; 144/353; 407/30; 407/54
[58] Field of Search ................... 407/30, 53, 54; 144/134 R, 134 A, 136 R, 150, 218, 219, 220, 240, 371, 365, 353

[56] References Cited

U.S. PATENT DOCUMENTS

| | | | |
|---|---|---|---|
| 803,295 | 10/1905 | Laskowitz | 144/220 |
| 1,316,959 | 9/1919 | Kieser | 144/219 |
| 1,328,430 | 1/1920 | Hathaway | 144/240 |
| 1,409,258 | 3/1922 | Stenger | 144/219 |
| 2,459,534 | 6/1923 | Wilker | 144/219 |
| 3,606,916 | 9/1971 | Day | 144/134 A |
| 4,470,733 | 9/1984 | Marques, Jr. | 144/240 |
| 4,593,734 | 6/1986 | Wallace | 144/240 |
| 4,741,370 | 5/1988 | Heaton | 144/136 R |

FOREIGN PATENT DOCUMENTS

| | | | |
|---|---|---|---|
| 234389 | 5/1911 | Germany | 144/240 |
| 288592 | 11/1915 | Germany | 144/240 |
| 11369 | 3/1920 | United Kingdom | 144/240 |

Primary Examiner—W. Donald Bray
Attorney, Agent, or Firm—Klima & Hopkins

[57] ABSTRACT

A drilling/cutting bit for forming joints in wooden members to be connected together by a coupling. The bit simultaneously forms a smaller width slot, a larger width slot, and a curved transition between the slots.

6 Claims, 3 Drawing Sheets

DRILLING/CUTTING BIT, AND METHOD OF MAKING JOINT

This is a continuation-in-part of U.S. patent application entitled "Drill/Cutting Bit, and Method of Making Structural Joint by Teruo Nakanishi, Serial No. 08/263,338, filed on Jun. 21, 1994, now U.S. Pat. No. 5,599,667, and U.S. patent application entitled "Drilling/Cutting Machine For Making Joints In Wooden Members by Teruo Nakanishi, Serial No. 08/274,825, filed on Jul. 14, 1994, herein both fully incorporated by reference.

FIELD OF THE INVENTION

This invention relates to a drilling/cutting bit for forming joints in wooden members so that the wooden members can be joined with a connector.

BACKGROUND OF THE INVENTION

There are various woodworking methods employed for use in wood constructions. One method uses a specified shaped coupling to join adjacent wooden members. Specifically, in this method uses a coupling A as shown in FIG. 5 to join adjacent wooden members 100 and 110 together.

The coupling A used in this method is comprises a pair of U-shaped portions 90, 91, located on the sides of body portion 92. The body portion 92 is formed with holes 93a, 93b extending downwardly from the top thereof. The coupling A is formed as a one-piece structure made of synthetic resin having substantial structural strength.

As shown in FIG. 5, curved transition portions exist between the thinner body portion 92 and the wider U-shaped portions 90, 91. The transition portions are characterized by the radius of curvature becoming larger, little-by-little, from the bottom portion 94a to the top portion 94b. Thus, the radius of curvature of the bottom portion 94a is smaller than that of the top portion 94b.

In order to couple the wooden members with the coupling A, the joints 120, 130 of the wooden members 100, 110, respectively, must be formed in the ends thereof. The joints 120, 130 are formed to match the profile of the coupling A. Specifically, the joint 120 formed in the end of the wooden member 100, as shown in FIG. 6, has a smaller width slot a with a U-shaped lower end and a larger width slot b with a U-shaped lower end.

The same joint is formed in the end of the wooden member 110. After the ends of the wooden member 100, 110 are brought together and aligned, the coupling A is inserted into the joints 120, 130 to in the direction of the arrows shown in FIG. 5.

The coupling A, due to its configuration described above, can be insert without much resistance to approximately one-half the depth of the joints 120, 130. Then, an appropriate tool is used to further drive the coupling A fully into the joints 120, 130. This completes the method of forming a joint with the coupling A securely joining the ends of the wooden members 100, 110.

In order to form the joints 120, 130, a drill and a milling cutter are normally employed according to the following steps:

(1) on the end section of the wooden member, a small U-shaped slot a is initially drilled;

(2) the milling cutter is inserted from the end section of the small U-shaped slot a of the wooden member; and (3) moving the milling cutter sideways along the smaller U-shaped slot a in a parallel manner to form the larger U-shaped slot b connecting into the smaller width slot a by a radius of curvature.

As explained above, this conventional method requires a drill and a milling cutter. Thus, the drill and cutter need to be switched during the conventional method of making the joints. To make highly accurate joints, each time the drill and cutter are exchanged, it requires time and effort to provide an exact setting of the drill and the milling cutter on the appointed marks as well as setting the exact moving distance and direction of the tools.

SUMMARY OF THE INVENTION

Thus, an object of the present invention is to provide a drill bit and method of forming joints in wooden member that requires less steps and time, and provides a high degree of accuracy in the formation of the joints.

This object can be achieved by application of the drilling/cutting bit according to the present invention for forming joints in wooden members.

The drilling/cutting bit according to the present invention is used for forming joints cooperating with a particular coupling. The body of the coupling comprises three sections including a pair of wider U-shaped portions located on sides of a thinner body portion with curved transition portions located between the body and U-shaped portions.

The drilling/cutting bit comprises a shank, a body having at least one groove with a main trailing cutting edge for forming the smaller width slot, and an end cutting blade having a bottom cutting edge and a side cutting edge for forming the larger width slot. The body further includes a curved trailing cutting edge. In a preferred embodiment the main trailing cutting edge of the body is continuous with the curved trailing cutting edge of the body, which is continuous with the side cutting edge of the end cutting blade.

The drilling/cutting bit according to the present invention is not limited to the drilling/cutting bit described above. For example, the drilling/cutting bit preferably includes two or more grooves with respective trailing cutting edges to increase the cutting rate of the bit. Further, the grooves can be straight, spiral, or some other suitable shape to change or improve the cutting characteristics of the bit. In addition, the end cutting blade preferably includes two or more bottom cutting edges and two or more side cutting edges, again to increase the cutting rate thereof.

The method according to the present invention involves used the drilling/cutting bit according to the present invention to form joints in wooden members.

The method includes the steps of 1) positioning the drilling/cutting bit on one side at the end of a wooden member; 2) moving the drilling/cutting bit sideways a predetermined distance while maintaining the drilling/cutting bit at a fixed depth. The drilling/cutting bit provides the joint in the following manner:

(1) by the main trailing cutting edge of the groove of the body, the smaller width slot having a U-shaped bottom portion is made at the end of the wooden member;

(2) simultaneously, by the bottom and side cutting edges of the end cutting blade, the larger width slot having a U-shaped slot is made at the end of the wooden member; and (3) by the curved trailing cutting edge of the groove of the body, the curved transition portions of the joint between the larger width slot and the smaller width slot are simultaneously made at the end of the wooden member.

As explained, if the drilling/cutting bit according to the present invention is utilized, then there is no need to use two different types of bits (e.g. drill and cutter). Thus, it is not necessary to change the bits nor to reset bits during the entire operation of forming the joints saving considerable time and making the operation substantially easier.

BRIEF DESCRIPTION OF THE DRAWINGS

The invention will now be described by way of example with reference to the accompanying drawings in which.

DETAILED DESCRIPTION OF PREFERRED EMBODIMENTS

Figure 5:
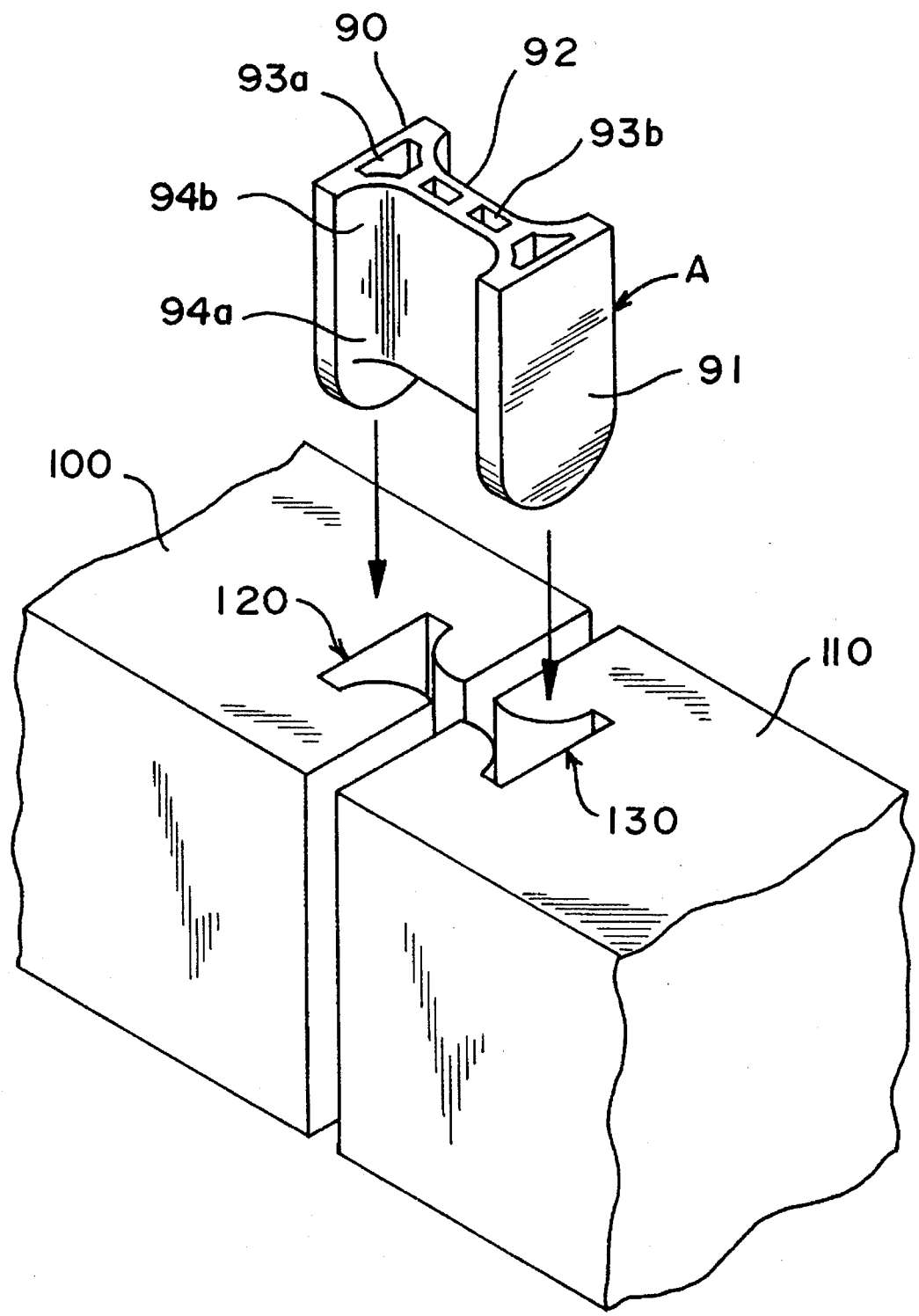
FIG. 5 is a perspective view of a pair of wooden member joined end-to-end by joints made of the drilling/cutting bit according to the present invention.
Figure 6:
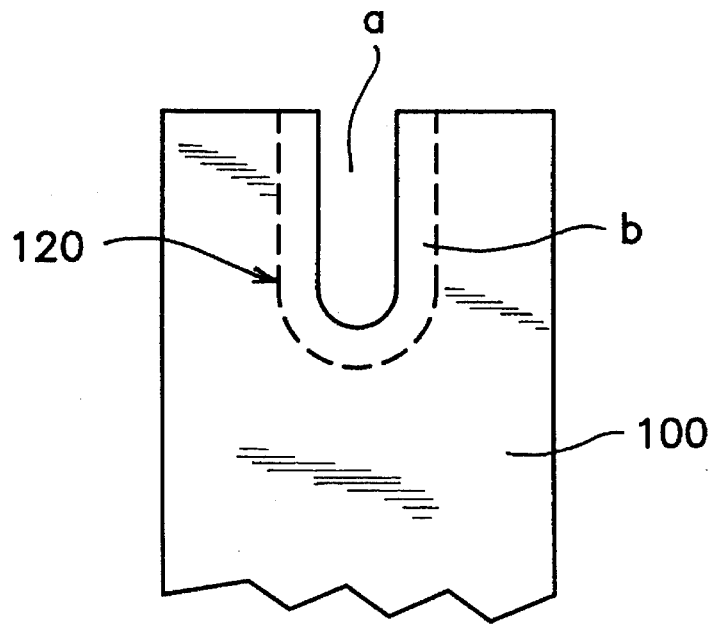
FIG. 6 is an end view of one of the wooden members shown in FIG. 5, showing details of the shape of the joint cut in the end thereof.
Figure 7:
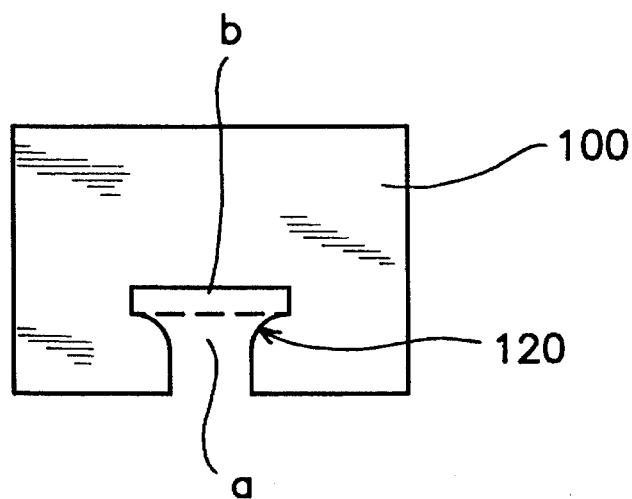
FIG. 7 is top view of the end of the wooden member shown in FIG. 6, showing details of the shape of the joint.

An embodiment of the drilling/cutting bit according to the present invention is shown in FIGS. 1 to 4. Joints made by the drilling/cutting bit in wooden members is shown in FIGS. 5 to 7, for joining the wooden members together.

Figure 1:
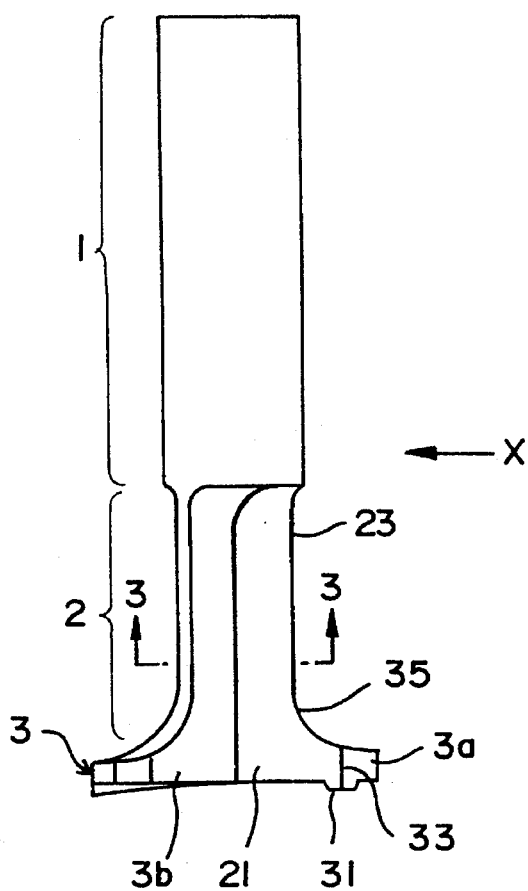
FIG. 1 is a side elevational view of an embodiment of the drilling/cutting bit according to the present invention.
Figure 2:
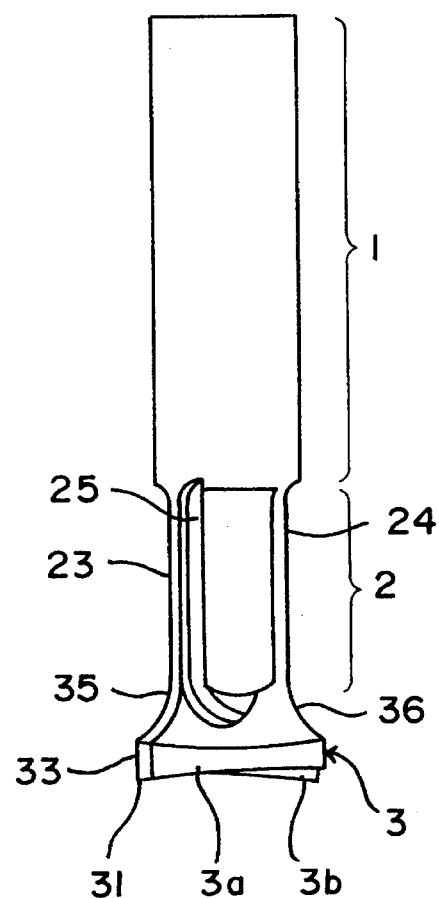
FIG. 2 is another side elevational view of the drilling/cutting bit shown in FIG. 1, view from the direction of arrow X in FIG. 1.
Figure 3:
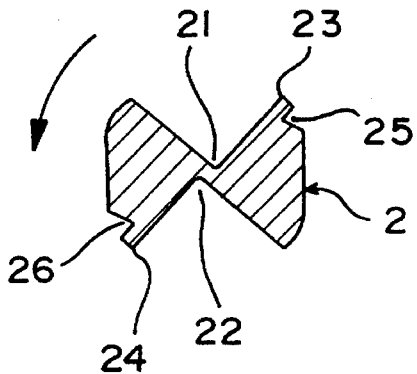
FIG. 3 is a cross-sectional view through the body of the drilling/cutting bit shown in FIG. 1.
Figure 4:
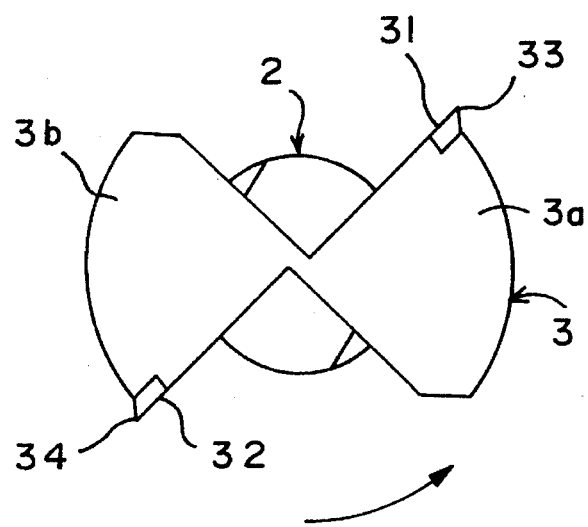
FIG. 4 is a bottom view of the drilling/cutting bit shown in FIG. 1.

The drilling/cutting bit comprises a shank 1, body 2 and end cutting blade 3, as shown in FIG. 1. The body 2 is provided with two (2) grooves 21, 22 having main trailing cutting edges 23, 24, respectively. The grooves 21, 22 are preferably straight grooves.

The end cutting blade 3 is defined by a pair of cutting blades 3a, 3b that protrude at essentially right angles to the length of the drilling/cutting bit. The cutting blades 3a, 3b are provided with bottom cutting edges 31, 32, respectively, and side cutting edges 33, 34 formed on the peripheral surface of the cutting blades 3a, 3b, respectively.

The grooves 21, 22 of the body 2 include a set of curved trailing cutting edges 35, 36, respectively. Specifically, the curved trailing cutting edges 35, 36 are extensions of the cutting edges 23, 24, respectively. The curved trailing cutting edges 35, 36 extend to the side cutting edges 33, 34, respectively, of the end cutting blade 3.

The main trailing cutting edges 23, 24 of the drilling/cutting tool cut the smaller diameter slot a, as shown in FIG. 6, when the drilling/cutting tool is moved downwardly. Simultaneously, the larger diameter slot b is cut by the bottom cutting edges 31, 32 and side cutting edges 33, 34, when the drilling/cutting tool is moved downwardly. Further, the curved transition between the smaller width slot and larger slot is simultaneously formed by curved trailing cutting edges 35, 36.

The method according to the present invention for making a joint in wooden members so that the wooden members can be joined together by a coupling, comprising the steps of 1) cutting a smaller width groove at a predetermined depth from the surface of the wooden member; 2) simultaneously cutting a larger width groove at a predetermined depth greater than said smaller width groove; and 3) simultaneously cutting a curved transition groove between said smaller width groove and said larger width groove.

Further the preferred method makes the grooves simultaneously with the drilling/cutting bit according to the present invention, including a shank, a body connected to said shank, said body having at least one groove with a main trailing cutting edge for cutting a smaller width groove and a curved trailing cutting edge for cutting a curved transition groove, an end cutting blade, said end cutting blade having a bottom cutting edge and a side cutting edge for cutting a larger width groove.

What is claimed is:

1. A drilling/cutting bit for forming joints for connecting wooden members, said bit comprising:

a shank;

a body connected to said shank, said body having at least one groove with a main trailing cutting edge oriented Substantially parallel relative to a center longitudinal axis of the bit for cutting a smaller width groove and a curved trailing cutting edge for cutting a curved radially inwardly tapering transition groove; and an end cutting blade, said end cutting blade having a bottom cutting edge and a side cutting edge configured for cutting a rectangular groove adjacent a wider end of said curved radially inwardly tapering transition groove, said side cutting edge having a predetermined length and oriented substantially parallel relative to said main trailing cutting edge.

2. A bit according to claim 1, wherein said curved trailing cutting edge extends from said main trailing cutting edge of said body to said side cutting edge of said end cutting blade.

3. A bit according to claim 1, wherein said groove is defined by a pair of opposed grooves extending along the length of said body, and having respective main trailing cutting edges.

4. A bit according to claim 3, wherein said grooves are straight.

5. A method of making a joint in wooden members so that the wooden members can be joined together by a coupling, comprising the steps of:

cutting a smaller width groove at a predetermined depth from the surface of the wooden member;

simultaneously cutting a larger width groove at a predetermined depth greater than said smaller width groove; and simultaneously cutting a curved transition groove between said smaller width groove and said larger width groove.

6. A method according to claim 5, wherein said grooves are made simultaneously with a drilling/cutting bit, comprising:

a shank;

a body connected to said shank, said body having at least one groove with a main trailing cutting edge for cutting a smaller width groove and a curved trailing cutting edge for cutting a curved transition groove;

an end cutting blade, said end cutting blade having a bottom cutting edge and a side cutting edge for cutting a larger width groove.

* * * * *